(12) United States Patent
Yang et al.

(10) Patent No.: US 10,156,854 B2
(45) Date of Patent: Dec. 18, 2018

(54) UAV AND UAV LANDING CONTROL DEVICE AND METHOD

(71) Applicant: ZEROTECH (SHENZHEN) INTELLIGENCE ROBOT CO., LTD., Shenzhen (CN)

(72) Inventors: Jianjun Yang, Beijing (CN); Lin Yang, Beijing (CN)

(73) Assignee: ZEROTECH (SHENZHEN) INTELLIGENCE ROBOT CO., LTD., Shenzhen (CN)

( * ) Notice: Subject to any disclaimer, the term of this patent is extended or adjusted under 35 U.S.C. 154(b) by 121 days.

(21) Appl. No.: 15/198,068

(22) Filed: Jun. 30, 2016

(65) Prior Publication Data

US 2017/0336804 A1 Nov. 23, 2017

(30) Foreign Application Priority Data

May 23, 2016 (CN) .......................... 2016 1 0346128

(51) Int. Cl.
| | | |
|---|---|---|
| G05D 1/00 | (2006.01) | |
| G05D 1/04 | (2006.01) | |
| G05D 1/06 | (2006.01) | |
| B64C 39/02 | (2006.01) | |
| B64D 45/04 | (2006.01) | |
| B64D 47/08 | (2006.01) | |
| B64F 1/00 | (2006.01) | |

(52) U.S. Cl.
CPC ........... *G05D 1/042* (2013.01); *B64C 39/024* (2013.01); *B64D 45/04* (2013.01); *B64D 47/08* (2013.01); *B64F 1/007* (2013.01); *G05D 1/0011* (2013.01); *G05D 1/0676* (2013.01); *B64C 2201/146* (2013.01); *B64C 2201/18* (2013.01)

(58) Field of Classification Search
None
See application file for complete search history.

(56) References Cited

U.S. PATENT DOCUMENTS

| | | | |
|---|---|---|---|
| 2014/0343752 A1* | 11/2014 | Fisher | B64C 39/024 701/2 |
| 2016/0001883 A1 | 1/2016 | Sanz et al. | |
| 2017/0129603 A1* | 5/2017 | Raptopoulos | B64C 39/024 |
| 2017/0129618 A1 | 5/2017 | Shi et al. | |

FOREIGN PATENT DOCUMENTS

WO 2016/015310 A1 2/2016

OTHER PUBLICATIONS

European Partial Search Report dated Oct. 12, 2017 received in European Patent Application No. 16 18 3866.9.

* cited by examiner

*Primary Examiner* — Adam M Alharbi
(74) *Attorney, Agent, or Firm* — Scully Scott Murphy & Presser

(57) ABSTRACT

An unmanned aerial vehicle (UAV), a UAV landing control device and method. The UAV landing control method includes: receiving a trigger command; starting to monitor under control of the trigger command and outputting monitoring information based on a landing platform below the UAV, where the UAV has one or more rotors; and determining whether to control the one or more rotors of the UAV to stop rotation based on the monitoring information.

18 Claims, 4 Drawing Sheets

UAV AND UAV LANDING CONTROL DEVICE AND METHOD

TECHNICAL FIELD

Embodiments of the present disclosure relate to an unmanned aerial vehicle (UAV) and a UAV landing control device and method in a technical field of UAVs.

BACKGROUND

The landing of a traditional UAV is generally achieved through controlling a remote controller by a professional operator. An attitude balance and a throttle size or the like of the UAV need to be controlled in the landing process, so that a safe and normal landing of the UAV can be achieved. This kind of UAV landing operation methods has a high requirement on a user's operational capability, and the user can remotely control the UAV to land safely only after learning and training. In addition, the user needs to participate in the entire UAV landing process through manual control, and so a degree of intelligence is low. Furthermore, the operating process is relatively complex, and a fast, simple and convenient landing cannot be achieved. Thus, the user's experience cannot be improved.

In addition, because the UAV lands on the ground in the above landing approach, dust may be raised due to wind generated by rotation of the rotors when the UAV is close to the ground. If there is soil or water on the ground, the UAV may be stained. Even if the landing site is flat and suitable for landing, the user has to bend over to pick up the UAV after the UAV finishes landing, which adds a step of retrieving the UAV and is not beneficial for improvement of the user's experience.

SUMMARY

In a first aspect, embodiments of the present disclosure provide a UAV landing control device. The UAV landing control device includes: a trigger command receiving module configured to receive a trigger command; a monitoring module configured to start monitoring under control of the trigger command and to output monitoring information based on a landing platform below a UAV, where the UAV has one or more rotors; and a rotor control module configured to determine whether to control the one or more rotors of the UAV to stop rotation based on the monitoring information.

In a second aspect, embodiments of the present disclosure provide a UAV landing control method. The UAV landing control method includes: receiving a trigger command; starting to monitor under control of the trigger command and outputting monitoring information based on a landing platform below a UAV, where the UAV has one or more rotors; and determining whether to control the one or more rotors of the UAV to stop rotation based on the monitoring information.

In a third aspect, embodiments of the present disclosure provide a UAV. The UAV includes the UAV landing control device described above.

BRIEF DESCRIPTION OF THE DRAWINGS

In order to illustrate the technical solutions in the embodiments of the present disclosure more clearly, the drawings need to be used in the description of the embodiments will be briefly described in the following; it is understood that the drawings described below are only related to some embodiments of the present disclosure and are not considered as limitations for the scope. For one ordinary skilled person in the art, other drawings can be obtained according to these drawings without making additional creative effort.

DETAILED DESCRIPTION

Hereafter, the technical solutions of the embodiments of the present disclosure will be described in a clearly and fully understandable way in connection with the drawings related to the embodiments of the disclosure. It is obvious that the described embodiments are just a part but not all of the embodiments of the present disclosure. The components of the embodiments of the present disclosure described and illustrated in the accompanying drawings here may generally be distributed and designed according to different configurations. Thus, the detailed description on the embodiments of the present disclosure in the accompanying drawings are not intended to limit the protection scope of the present disclosure but are only intended to illustrate the preferred embodiments of the present disclosure. All other embodiments made by those skilled in the art without creative efforts on the basis of the embodiments of the present disclosure shall fall within the protection scope of the present disclosure.

Figure 1:
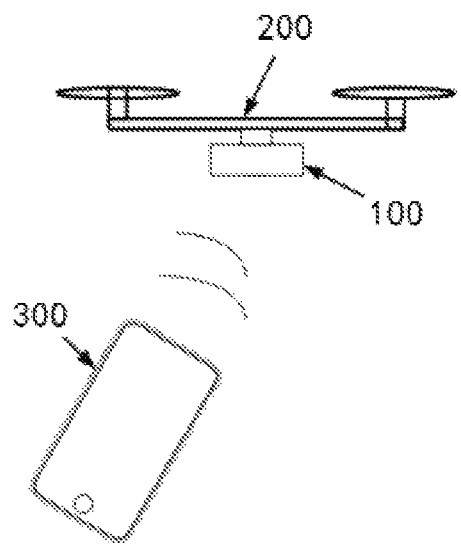
FIG. 1 illustrates an application environment of a UAV and a UAV landing control device and method provided by embodiments of the present disclosure.

FIG. 1 illustrates an exemplary application environment of a UAV and a UAV landing control device and method provided by the embodiments of the present disclosure. A user may send a command to a UAV 200 by a key of a remote control terminal 300 or by other approaches including acoustic control, gesture, etc. A UAV landing control device 100 may be configured on the UAV 200 to control the landing of the UAV.

First Embodiment

Figure 2:
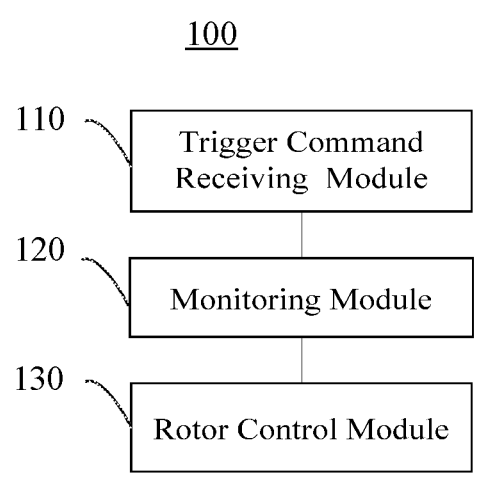
FIG. 2 illustrates a schematic diagram of a UAV landing control device provided by embodiments of the present disclosure.

FIG. 2 illustrates a UAV landing control device 100 provided by an embodiment of the present disclosure. The UAV landing control device 100 provided by the present disclosure includes: a trigger command receiving module 110, a monitoring module 120 and a rotor control module 130.

The trigger command receiving module 110 is configured to receive a trigger command.

In the embodiment of the present disclosure, firstly, a UAV 200 may be placed at a predetermined position with a default landing height. For instance, the UAV 200 may be controlled through the remote control terminal 300 to be placed at a default landing height (e.g., a height being flush with a top of a user's head, a height with 2 meters from the ground, or another suitable height, etc.). Furthermore, the UAV 200 may be controlled to be at a hovering state so as to get ready for landing.

Next, a trigger command is sent to the UAV 200 from the user. The trigger command is a command that causes the UAV 200 to enter a landing preparation state. The trigger command may be inputted through a key of the remote control terminal 300 or through other approaches such as acoustic control, gesture, etc. The input manner of the trigger command is not limited in the present disclosure. As for a trigger command inputted by a key triggering (e.g., a key command), the user triggers a key and the trigger command is sent to the UAV 200 through a wireless network in a form of a signal and may be received by an antenna disposed on the UAV 200. As for a trigger command inputted by an acoustic control approach, the user may input a specified acoustic control command, e.g., "landing preparation" or "ready to land," etc. The UAV 200 receives the acoustic control command to be the trigger command through an acoustic sensor. As for a trigger command inputted by a gesture approach, the user may perform a specified gesture command, e.g., a gesture such as swinging a palm up and down. The UAV 200 receives the gesture command to be the trigger command through an image acquisition device. In the above-mentioned embodiment, the antenna, the acoustic sensor, the image acquisition device, a motion sensing device or the like of the UAV 200 may be used as the trigger command receiving module 110. After receiving the trigger command, the trigger command receiving module 110 sends the trigger command to the monitoring module 120 in a form of a signal.

Furthermore, in the embodiment, the trigger command may be sent to the UAV 200 at first; and after the UAV 200 receives the trigger command, the user may place the UAV 200 at the predetermined position with the default landing height. For instance, when the trigger command is inputted by the user via an acoustic control approach, the UAV 200 may be flying at a higher height at that time. Then, the user may place the UAV 200 at the predetermined position with the default landing height and configure the UAV 200 to be at the hovering state via the remote control terminal 300. Of course, after the UAV 200 receives the trigger command, the UAV 200 may still respond to any control command sent from the remote control terminal 300. Actions on the UAV 200 are not limited in the embodiment of the present disclosure. For instance, the UAV 200 may respond to a command sent from the remote control terminal 300 to execute a landing action and is not limited to enter the above-mentioned hovering state.

In addition, in the present disclosure no limitation is placed on the default landing height of the UAV 200, and no limitation is placed on a flying status of the UAV 200 before receiving the trigger command. The UAV 200 may also be in a landing state or another state before receiving the trigger command.

Furthermore, after the trigger command receiving module 110 receives the trigger command, the UAV 200 enters the landing preparation state, and an alarm signal may be delivered by an alarm system to remind the user that the UAV 200 has entered the landing preparation state. The alarm system may be an existing LED indication light configured on the UAV 200. For instance, when the UAV 200 is in a normal flying state, the LED indication light may display green; and when the trigger command receiving module 110 receives the trigger command and the UAV 200 enters the landing preparation state, the LED indication light may display red and flicker in a fast pace, etc. In addition, the alarm system may also be an alarm light or a voice alarm device which is different from the existing LED indication light on the UAV 200. If the alarm system adopts the alarm light, for instance, when the UAV 200 is in the normal flying state, the alarm light may display green; and when the trigger command receiving module 110 receives the trigger command and the UAV 200 enters the landing preparation state, the alarm light may display red and flicker in a fast pace, etc. If the alarm system adopts the voice alarm device, for instance, when the trigger command receiving module 110 receives the trigger command and the UAV 200 enters the landing preparation state, the voice alarm device may present a voice signal such as "landing shortly," etc. It should be noted that the alarm system may be configured according to actual needs and the alarm approach of the alarm system may be changed by those skilled in the art.

The monitoring module 120 is configured to start monitoring under the control of the trigger command and to output monitoring information based on a landing platform below the UAV 200.

In the embodiment of the present disclosure, the monitoring module 120 may include one or more of a distance sensor, a velocity sensor and an image acquisition device, etc., configured on the UAV 200. The distance sensor may include one or more of an ultrasonic sensor, a laser distance sensor and an infrared distance sensor, etc., configured directly under the UAV 200. The image acquisition device, for instance, may also be disposed directly under the UAV 200. No limitation is placed on the specific position of the velocity sensor.

In the embodiment of the present disclosure, the landing platform may be a hand of the user or another flat surface (e.g., a plate, a book or another object handheld by the user). The landing platform may be disposed below the UAV 200 all the time or may be moved to a position below the UAV 200 by the user at an appropriate moment for the UAV 200 to land on.

If the monitoring module 120 includes a distance sensor, the distance sensor may monitor a spatial distance of the UAV 200 in a vertical descent direction after receiving the trigger command. When the landing platform is moved to a position below the UAV 200 rapidly by the user, the spatial distance of the UAV 200 in the vertical descent direction monitored by the distance sensor may be reduced quickly (e.g., being reduced quickly from a vertical distance between the UAV 200 and the ground to a vertical distance between the UAV 200 and the landing platform). The distance sensor monitors the vertical distance between the UAV 200 and the landing platform and sends the vertical distance between the UAV 200 and the landing platform to the rotor control module 130. The vertical distance between the UAV 200 and the landing platform is a distance between the UAV 200 and the landing platform in the vertical direction. In this case, the monitoring information includes the vertical distance between the UAV 200 and the landing platform.

If the monitoring module 120 includes a distance sensor with a minimum measuring distance such as an ultrasonic sensor or the like, the ultrasonic sensor cannot output valid distance information when the landing platform is moved to a position below the UAV 200 quickly by the user and the vertical distance between the UAV 200 and the landing platform is less than the minimum measuring distance of the ultrasonic sensor. Instead, the ultrasonic sensor outputs invalid identification information. In this case, the output result of the ultrasonic sensor is changed from the valid distance information to the invalid identification information, and the monitoring information includes the invalid identification information.

If the monitoring module 120 includes an image acquisition device, the image acquisition device may be a binocular camera or a monocular camera. The image acquisition device may be configured to capture and output images of the landing platform. When the landing platform is moved to a position below the UAV 200 quickly by the user, the image acquisition device may output a clear image if a distance between the landing platform and the UAV 200 is within a focus range of the image acquisition device; if the landing platform is very close to the UAV 200, causing a failure of the image acquisition device to focus on the landing platform, the image acquisition device outputs an unclear image, and the distance between the image acquisition device and the landing platform is out of focus due to closeness. In the embodiment, a computation of feature values using an image corner detection method can be used to determine whether the distance between the image acquisition device and the landing platform is out of focus due to closeness. In this case, the monitoring information includes the unclear image outputted by the image acquisition device.

If the monitoring module 120 includes a velocity sensor, the velocity sensor may be configured to monitor a vertical descent velocity of the UAV 200. The vertical descent velocity of the UAV 200 is a flying velocity of the UAV 200 in a vertical descent direction. When the UAV 200 descends according to a preset descent velocity, the UAV 200 may make contact with the landing platform if the user moves the landing platform to a position below the UAV 200 quickly and holds up the descending UAV 200 with the landing platform quickly. In this case, a sudden change occurs to the vertical descent velocity of the UAV 200. It should be noted that "a sudden change" used herein indicates that the vertical descent velocity of the UAV 200 is instantaneously changed from the preset descent velocity to a velocity that is less than a limit value, e.g., 0.05 m/s. In the embodiment, the velocity sensor may include an acceleration sensor, a GPS sensor, an ultrasonic sensor, and a barometer, etc. For instance, the vertical descent velocity of the UAV 200 can be obtained according to an integral of the acceleration sensor. However, the acceleration sensor has a drifting problem, causing a large deviation in the obtained velocity from a long-term integral process. Thus, the deviation may be corrected by other sensors in real time. For instance, the vertical descent velocity obtained according to the integral of the acceleration sensor may be corrected by utilization of an instantaneous vertical descent velocity of the UAV measured by the GPS sensor, the ultrasonic sensor and/or the barometer. The correction approach may be achieved by a Kalman filtering algorithm. The Kalman filtering algorithm estimates an optimal vertical descent velocity of the UAV by integration of instantaneous vertical descent velocities outputted from the sensors such as the acceleration sensor, the GPS sensor and the ultrasonic sensor, etc. In this case, the monitoring information includes the vertical descent velocity of the UAV 200.

Furthermore, in the above-mentioned embodiment, the monitoring module 120 outputs the monitoring information based on the landing platform below the UAV 200, and subsequently sends the monitoring information to the rotor control module 130.

It should be noted that the monitoring module 120 may simultaneously include two or more of the ultrasonic sensor or other distance sensors, the image acquisition device and the velocity sensor, etc. The resultant monitoring information may also simultaneously include two or more of invalid identification information outputted by the ultrasonic sensor, the vertical distance between the UAV 200 and the landing platform, the unclear image outputted by the image acquisition device, and the vertical descent velocity of the UAV 200, etc.

For instance, the UAV 200 has one or more rotors, and the rotor control module 130 is configured to determine whether to control the one or more rotors of the UAV 200 to stop rotation based on the monitoring information. Each of the one or more rotors of the UAV 200 may be controlled to stop rotation simultaneously based on the monitoring information. For instance, the UAV 200 includes multiple rotors, and the rotor control module 130 is configured to determine whether to control the multiple rotors of the UAV 200 to stop rotation based on the monitoring information. A rotor described herein may include an assembly of rotating blades that supplies lift or stability for a UAV. For example, a rotor may be referred to as a rotary wing.

In the embodiment of the present disclosure, the rotor control module 130 may be a flight controller of the UAV 200.

When the monitoring module 120 includes the distance sensor, the rotor control module 130 may control the one or more rotors of the UAV to stop rotation if the vertical distance between the UAV 200 and the landing platform monitored by the distance sensor is less than a threshold. In the embodiment, the threshold may be a preset value, for instance, 40 cm or less (e.g., 15 cm). For instance, the threshold is preset to be 30 cm; when the vertical distance between the UAV 200 and the landing platform monitored by the distance sensor is less than 30 cm, it can be determined that there is a landing platform suitable for landing below the UAV 200, and the rotor control module 130 controls the one or more rotors of the UAV 200 to stop rotation quickly, so that the UAV 200 can land on the landing platform. For instance, if the UAV 200 includes a single rotor, the rotor control module 130 controls the single rotor of the UAV 200 to stop rotation. If the UAV 200 includes multiple rotors, the rotor control module 130 controls the multiple rotors of the UAV 200 to stop rotation simultaneously.

When the monitoring module 120 includes the ultrasonic sensor, the rotor control module 130 may control the one or more rotors of the UAV to stop rotation based on the invalid identification information outputted by the ultrasonic sensor. For instance, when the vertical distance between the landing platform and the UAV 200 is within the measuring range of the ultrasonic sensor, the output result of the ultrasonic sensor is valid distance information; and when the vertical distance between the landing platform and the UAV 200 is less than the minimum measuring distance of the ultrasonic sensor, the ultrasonic sensor cannot output valid distance information but outputs invalid identification information. In this case, the rotor control module 130 may monitor the output result of the ultrasonic sensor being changed from the valid distance information to the invalid identification information and may therefore determine that there is a landing platform suitable for landing below the UAV 200. The rotor control module 130 controls the one or more rotors of the UAV 200 to stop rotation quickly, so that the UAV 200 can land on the landing platform.

When the monitoring module 120 includes the image acquisition device, the rotor control module 130 may control the one or more rotors of the UAV to stop rotation when the image of the landing platform outputted by the image acquisition device does not satisfy a predetermined standard. In the embodiment, when the landing platform is very close to the UAV 200 such that the image acquisition device cannot focus on the landing platform, the image acquisition device outputs an unclear image. When the rotor control module 130 determines that the unclear image outputted by the image acquisition device does not satisfy the predetermined standard (for instance, a degree of clearness of the unclear image being less than a preset value), it can be determined that there is a landing platform suitable for landing below the UAV 200. In this case, the rotor control module 130 controls the one or more rotors of the UAV 200 to stop rotation quickly, so that the UAV 200 can land on the landing platform.

When the monitoring module 120 includes the velocity sensor, the rotor control module 130 may control the one or more rotors of the UAV 200 to stop rotation when the landing platform makes contact with the UAV 200 to cause a sudden change on the vertical descent velocity of the UAV 200. In the embodiment, in the landing process of the UAV 200, if the user moves the landing platform to a position below the UAV 200 quickly and holds up the descending UAV 200 with the landing platform quickly, the UAV 200 may make contact with the landing platform. In this case, the vertical descent velocity of the UAV 200 may change suddenly, and the rotor control module 130 may determine that there is a landing platform suitable for landing below the UAV 200. The rotor control module 130 controls the one or more rotors of the UAV 200 to stop rotation immediately, so that the UAV 200 can land on the landing platform safely.

Furthermore, after the one or more rotors of the UAV 200 is controlled to stop rotation, the distance sensor also continuously monitors the vertical distance between the UAV 200 and the landing platform during the landing process of the UAV 200. When the vertical distance between the UAV 200 and the landing platform is greater than a threshold, the rotor control module 130 may determine that the landing platform below the UAV 200 has been removed or it is not suitable for the UAV 200 to proceed landing. The rotor control module 130 controls the one or more rotors of the UAV to accelerate rotation and the UAV 200 restores to the hovering state or continues in the flying state so as to avoid accidents. In the embodiment, the threshold may be 40 cm, 15 cm or another distance value. For instance, if the UAV 200 is a multi-rotor UAV, the rotor control module 130 controls one or more rotors of the UAV to accelerate rotation and the UAV 200 restores to the hovering state or continues in the flying state.

Furthermore, after the one or more rotors of the UAV 200 is controlled to stop rotation, the ultrasonic sensor also continuously monitors the vertical distance between the UAV 200 and the landing platform during the landing process of the UAV 200. When the vertical distance between the UAV 200 and the landing platform is greater than the minimum measuring distance of the ultrasonic sensor, the output result of the ultrasonic sensor is changed from invalid identification information to valid distance information. In this case, the rotor control module 130 may determine that the landing platform below the UAV 200 has been removed or it is not suitable for the UAV 200 to proceed landing. The rotor control module 130 controls the one or more rotors of the UAV 200 to accelerate rotation and the UAV 200 restores to the hovering state or continues in the flying state.

Furthermore, after the one or more rotors of the UAV 200 is controlled to stop rotation, the image acquisition device also continuously captures and outputs the image of the landing platform during the landing process of the UAV 200. When the image of the landing platform is satisfied with the predetermined standard, the rotor control module 130 may determine that: the distance between the landing platform and the UAV 200 is increased; and the landing platform below the UAV 200 has been removed or it is not suitable for the UAV 200 to proceed landing. The rotor control module 130 controls the one or more rotors of the UAV to accelerate rotation and the UAV 200 restores to the hovering state or continues in the flying state.

Furthermore, the monitoring module 120 may further include an inertial measurement unit (IMU) formed by a gyroscope and an acceleration sensor. After the one or more rotors of the UAV 200 is controlled to stop rotation, the IMU may also monitor the attitude of the UAV 200 in real time to obtain an angle of inclination of the UAV 200 during the landing process of the UAV 200. When the angle of inclination of the UAV 200 is greater than a preset angle threshold, the rotor control module 130 controls the one or more rotors of the UAV 200 to accelerate rotation and the UAV 200 restores to the hovering state. The preset angle threshold may be set according to practical conditions; for instance, the present angle threshold may be 60 degrees or another appropriate angle. When the UAV 200 is inclined or turned at an angle that is equal to or greater than the preset angle threshold, the UAV 200 is not suitable for landing, and the rotor control module 130 may control the rotor to accelerate rotation so as to stop the landing process of the UAV 200.

Second Embodiment

Figure 3:
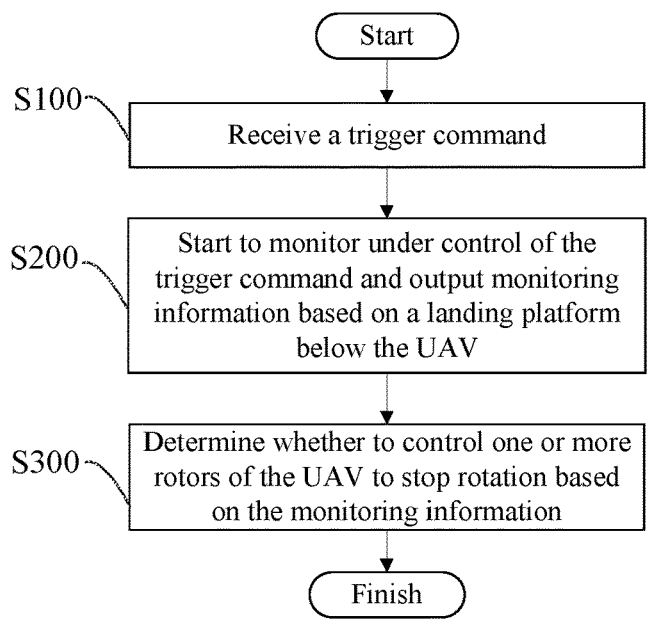
FIGS. 3-7 illustrate schematic flow diagrams of a UAV landing control method provided by embodiments of the present disclosure.

FIGS. 3 to 7 illustrate flow diagrams of a UAV landing control method provided by embodiments of the present disclosure. As illustrated in FIG. 3, the UAV landing control method provided by an embodiment of the present disclosure includes the following steps:

Step S100: receiving a trigger command.

In the embodiment of the present disclosure, the step S100 may be executed by the trigger command receiving module 110. The user issues the trigger command to the UAV 200. The trigger command is a command that causes the UAV 200 to enter the landing preparation state. The trigger command may be inputted through a key of the remote control terminal 300 or through other approaches such as acoustic control, gesture, etc. The input approach of the trigger command is not limited in the present disclosure. As for a trigger command inputted by a key triggering, the user triggers a key and the trigger command is sent to the UAV 200 through a wireless network in the form of a signal and may be received by an antenna disposed on the UAV 200. As for a trigger command inputted by an acoustic control approach, the user may input a specified acoustic control command, e.g., "landing preparation" or "ready to land," etc. The UAV 200 receives the acoustic control command to be the trigger command through an acoustic sensor. As for a trigger command inputted by a gesture approach, the user may perform a specified gesture command, e.g., a gesture such as swinging a palm up and down. The UAV 200 receives the gesture command to be the trigger command through an image acquisition device. In the above-mentioned embodiment, the antenna, the acoustic sensor, the image acquisition device or the like of the UAV 200 may be used as the trigger command receiving module 110.

Furthermore, after the trigger command receiving module 110 receives the trigger command, the UAV 200 enters the landing preparation state, and an alarm signal may be delivered by an alarm system to remind the user that the UAV 200 has entered the landing preparation state. The alarm system may be an existing LED indication light configured on the UAV 200. For instance, when the UAV 200 is in a normal flying state, the LED indication light may display green; and when the trigger command receiving module 110 receives the trigger command and the UAV 200 enters the landing preparation state, the LED indication light may display red and flicker in a fast pace, etc. In addition, the alarm system may also be an alarm light or a voice alarm device which is different from the existing LED indication light on the UAV 200. If the alarm system adopts the alarm light, for instance, when the UAV 200 is in the normal flying state, the alarm light may display green; and when the trigger command receiving module 110 receives the trigger command and the UAV 200 enters the landing preparation state, the alarm light may display red and flicker in a fast pace, etc. If the alarm system adopts the voice alarm device, for instance, when the trigger command receiving module 110 receives the trigger command and the UAV 200 enters the landing preparation state, the voice alarm device may deliver a voice signal such as "landing shortly," etc. It should be noted that the alarm system may be configured according to actual needs and the alarm approach of the alarm system may be changed by those skilled in the art.

Step S200: starting to monitor under control of the trigger command and outputting monitoring information based on a landing platform below the UAV.

In the embodiment of the present disclosure, the step S200 may be executed by the monitoring module 120. The monitoring module 120 may include a distance sensor, a velocity sensor or an image acquisition device, etc., disposed on the UAV 200. The distance sensor may include an ultrasonic sensor, a laser distance sensor or an infrared distance sensor, etc., disposed under the UAV 200.

In the embodiment of the present disclosure, the landing platform may be a hand of the user or another flat surface (e.g., a plate, a book or another object handheld by the user). The landing platform may be disposed below the UAV 200 all the time or may be moved to a position below the UAV 200 by the user at an appropriate moment for the UAV 200 to land on.

Figure 4:
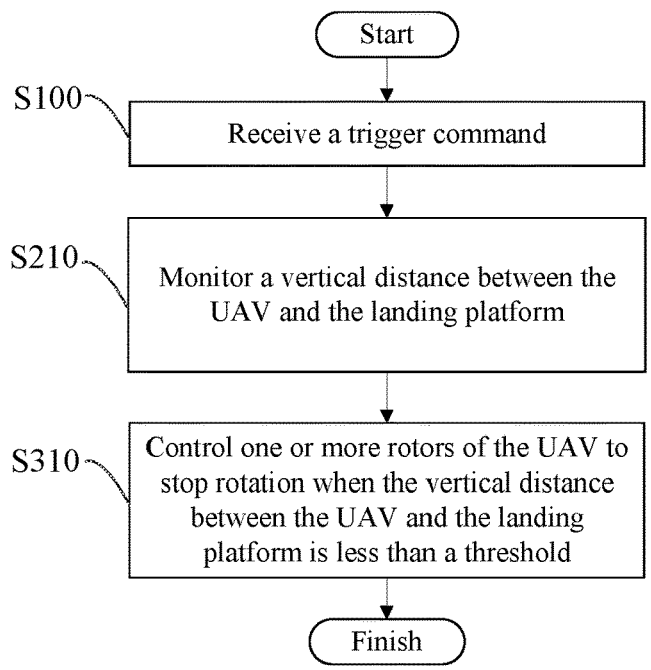

As illustrated in FIG. 4, when the monitoring module 120 includes a distance sensor, the step S200 may include step S210: monitoring, by the distance sensor, a vertical distance between the UAV 200 and the landing platform, and sending the vertical distance between the UAV 200 and the landing platform to the rotor control module 130.

Figure 5:
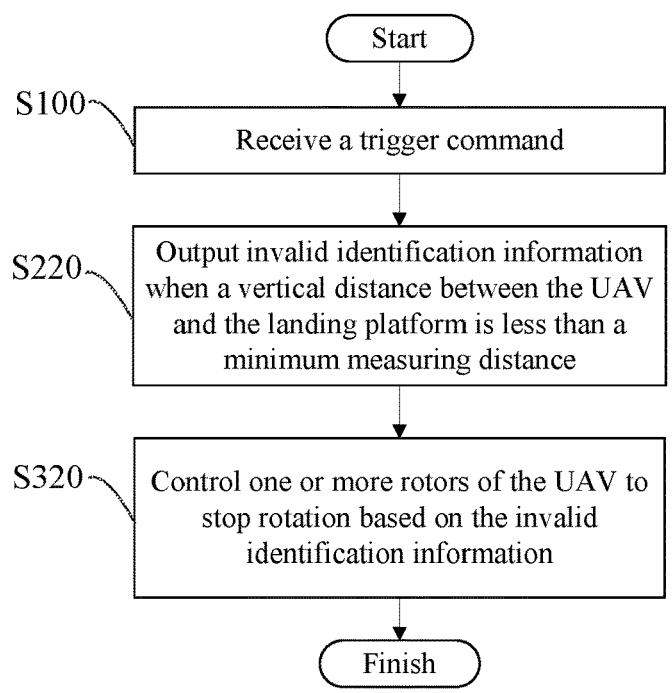

As illustrated in FIG. 5, when the monitoring module 120 includes a distance sensor with a minimum measuring distance such as an ultrasonic sensor, the step S200 may include step S220: outputting, by the ultrasonic sensor, invalid identification information when the vertical distance between the UAV 200 and the landing platform is less than the minimum measuring distance of the ultrasonic sensor.

Figure 6:
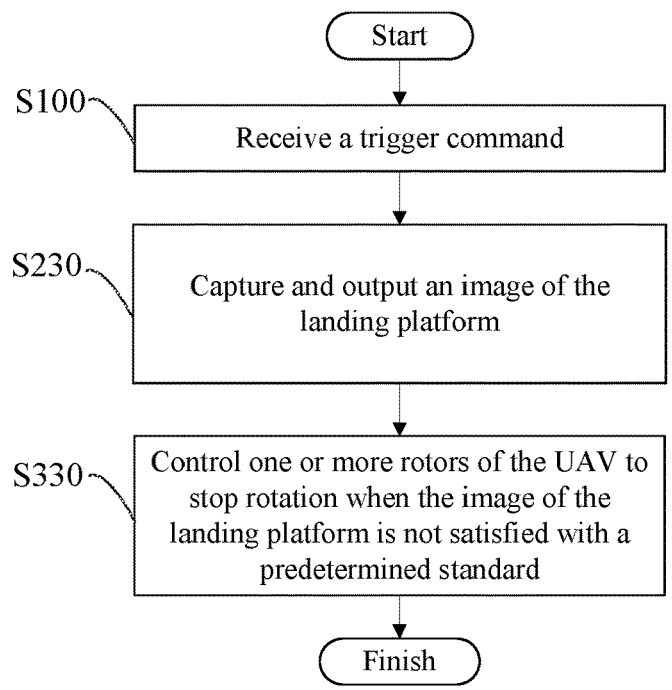

As illustrated in FIG. 6, when the monitoring module 120 includes an image acquisition device, the step S200 may include step S230: capturing and outputting, by the image acquisition device, an image of the landing platform. In the case when the landing platform is moved to a position below the UAV 200 quickly by the user, if the landing platform is very close to the UAV 200 causing a failure of the image acquisition device to focus on the landing platform, the image acquisition device outputs an unclear image.

Figure 7:
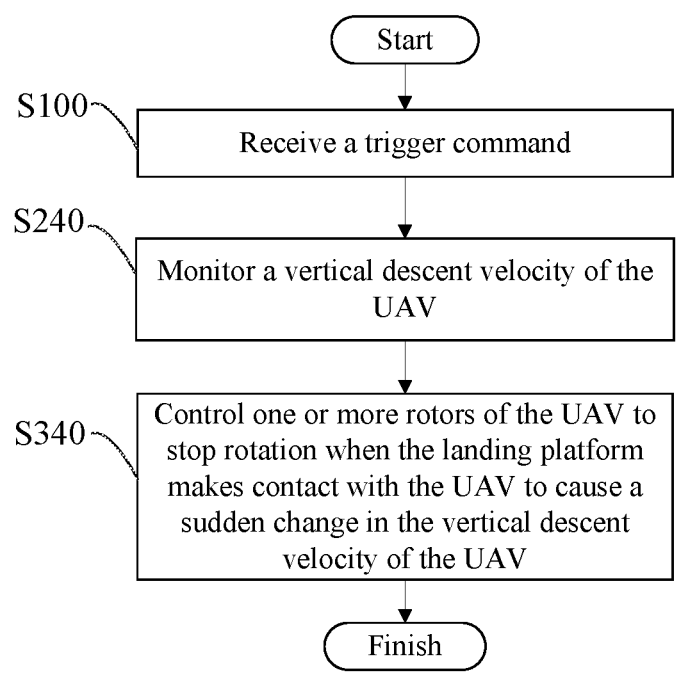

As illustrated in FIG. 7, when the monitoring module 120 includes a velocity sensor, the step S200 may include step S240: monitoring, by the velocity sensor, a vertical descent velocity of the UAV 200. When the UAV 200 descends according to a preset descent velocity, the UAV 200 may make contact with the landing platform if the user moves the landing platform to a position below the UAV 200 quickly and holds up the descending UAV 200 with the landing platform quickly. In this case, a sudden change occurs to the vertical descent velocity of the UAV 200. It should be noted that a sudden change used herein indicates that the vertical descent velocity of the UAV 200 is instantaneously changed from the preset descent velocity to a velocity that is less than a limit value, e.g., 0.05 m/s.

Step S300: determining whether to control one or more rotors of the UAV to stop rotation based on the monitoring information.

In the embodiment of the present disclosure, the step S300 may be executed by the rotor control module 130. The rotor control module 130 may be a flight controller of the UAV 200.

As illustrated in FIG. 4, when the monitoring module 120 includes a distance sensor, the step S300 may include step S310: determining, by the rotor control module 130, that there is a landing platform suitable for landing below the UAV 200 when the vertical distance between the UAV 200 and the landing platform monitored by the distance sensor is less than a threshold; and controlling, by the rotor control module 130, the one or more rotors of the UAV 200 to stop rotation quickly, so that the UAV 200 can land on the landing platform.

As illustrated in FIG. 5, when the monitoring module 120 includes an ultrasonic sensor, the step S300 may include step S320: determining, by the rotor control module 130, that there is a landing platform suitable for landing below the UAV 200 based on the invalid identification information outputted by the ultrasonic sensor; and in this case, controlling, by the rotor control module 130, the one or more rotors of the UAV 200 to stop rotation quickly, so that the UAV 200 can land on the landing platform.

As illustrated in FIG. 6, when the monitoring module 120 includes an image acquisition device, the step S300 may include step S330: determining, by the rotor control module 130, that there is a landing platform suitable for landing below the UAV 200 when the image of the landing platform outputted by the image acquisition device is not satisfied with a predetermined standard; and in this case, controlling, by the rotor control module 130, the one or more rotors of the UAV 200 to stop rotation quickly, so that the UAV 200 can land on the landing platform.

As illustrated in FIG. 7, when the monitoring module 120 includes a velocity sensor, the step S300 may include step S340: determining, by the rotor control module 130, that there is a landing platform suitable for landing below the UAV 200 when the landing platform makes contact with the UAV 200 causing the vertical descent velocity of the UAV 200 to change suddenly; and in this case, controlling, by the rotor control module 130, the one or more rotors of the UAV 200 to stop rotation quickly, so that the UAV 200 can land on the landing platform safely.

Furthermore, after the one or more rotors of the UAV 200 is controlled to stop rotation, the vertical distance between the UAV 200 and the landing platform may be monitored continuously by the distance sensor during the landing process of the UAV 200. When the vertical distance between the UAV 200 and the landing platform is greater than a threshold, the rotor control module 130 may determine that the landing platform below the UAV 200 has been removed or it is not suitable for the UAV 200 to proceed landing. The rotor control module 130 controls the one or more rotors of the UAV to accelerate rotation and the UAV 200 restores to the hovering state or continues in the flying state so as to avoid accidents. In the embodiment, the threshold may be 40 cm, 15 cm or another suitable distance value.

Furthermore, after the one or more rotors of the UAV 200 is controlled to stop rotation, the vertical distance between the UAV 200 and the landing platform may be monitored continuously by the ultrasonic sensor during the landing process of the UAV 200. When the vertical distance between the UAV 200 and the landing platform is greater than the minimum measuring distance of the ultrasonic sensor, the output result of the ultrasonic sensor is changed from invalid identification information to valid distance information. In this case, the rotor control module 130 may determine that the landing platform below the UAV 200 has been removed or it is not suitable for the UAV 200 to proceed landing. The rotor control module 130 controls the one or more rotors of the UAV 200 to accelerate rotation and the UAV 200 restores to the hovering state or continues in the flying state.

Furthermore, after the one or more rotors of the UAV 200 is controlled to stop rotation, the image of the landing platform may be captured and outputted continuously by the image acquisition device during the landing process of the UAV 200. When the image of the landing platform is satisfied with the predetermined standard, the rotor control module 130 may determine that: the distance between the landing platform and the UAV 200 is increased; and the landing platform below the UAV 200 has been removed or it is not suitable for the UAV 200 to proceed landing. The rotor control module 130 controls the one or more rotors of the UAV to accelerate rotation, and the UAV 200 restores to the hovering state or continues in the flying state.

Furthermore, after the one or more rotors of the UAV 200 is controlled to stop rotation, a step of monitoring an attitude of the UAV 200 in real time to obtain an angle of inclination of the UAV 200 may also be included during the landing process of the UAV 200. When the angle of inclination of the UAV 200 is greater than a preset angle threshold, the one or more rotors of the UAV 200 is controlled to accelerate rotation and the UAV 200 restores to the hovering state. The preset angle threshold may be set according to practical conditions; for instance, the present angle threshold may be 60 degrees or another appropriate angle. When the UAV 200 is inclined or turned at an angle that is equal to or greater than the preset angle threshold, the UAV 200 is not suitable for landing, and the rotor control module 130 may control the rotor to accelerate rotation so as to stop the landing process of the UAV 200. For instance, the attitude monitoring of the UAV 200 may be performed by an inertial measurement unit (IMU) including a gyroscope and an acceleration sensor.

In addition, the trigger command receiving module 110, the monitoring module 120 and the rotor control module 130 of the UAV landing control device 100 provided by the embodiments of the present disclosure may further include hardware, firmware and/or software functional modules. The UAV 200 may include a memory, a processor and the UAV landing control device 100. The software functional modules of the UAV landing control device 100 may be stored in the memory and executed by the processor to implement corresponding operations.

The processor may process data signals and may include various computing structures, for instance, a complex instruction set computer (CISC) structure, a reduced instruction set computer (RISC) structure or a structure for the implementation of a combination of multiple instruction sets. The memory may store instructions and/or data executed by the processor. The instructions and/or data may include codes and are configured to implement some functions or all the functions of one or more devices in the embodiment of the present disclosure. For instance, the memory includes a dynamic random access memory (DRAM), a static random access memory (SRAM), a flash memory, an optical memory or other nonvolatile memories known by those skilled in the art.

In some embodiments, the UAV landing control device may be configured on the UAV. For instance, each module of the UAV landing control device is configured on the UAV. Of course, in some other embodiments, one part of the UAV landing control device may be configured on the UAV and another part of the UAV landing control device may be configured on a remote controller. For instance, some modules of the UAV landing control device may be configured on the UAV and other modules of the UAV landing control device may be configured on the remote controller.

In the UAV and the UAV landing control device and method provided by the embodiments of the present disclosure, the UAV can land on a hand or other landing platforms from a predetermined height and position according to user demands, so that the landing operation can be simplified. Furthermore, because the UAV lands directly on the landing platform rather than on the ground, there is no need to consider problems such as cleanness, flatness or the like of the ground. The problem that the rotor may raise dust when the UAV is close to the ground will not occur, and the user does not need to bend over to pick up the UAV. Thus, the user's experience can be improved.

It should be noted that: in this context, the relational terms such as first and second are merely used to distinguish one entity or operation from another entity or operation and do not require or imply that the entities or operations have any actual relation or sequence. In the present disclosure, the terms "comprise", "include" and any other variation thereof are intended to cover a non-exclusive inclusion, so that the process, method, article or device comprising a series of elements not only includes these elements but also includes other elements not clearly listed or further includes the inherent elements of the process, method, article or device. Without more constraints, the elements defined by "including one" do not exclude other same elements in the process, method, article or device of the element.

The foregoing is only the preferred embodiments of the present disclosure and not intended to limit the present disclosure. Various changes and modifications may be made to the present disclosure by those skilled in the art. Any modification, equivalent replacement, improvement and the like made within the spirit and the principle of the present disclosure shall all fall within the scope of protection of the present disclosure. Therefore, the scope of protection of the present disclosure shall be defined by the claims. It should be noted that: as similar reference numerals and letters in the accompanying drawings refer to similar items, once an item is defined in one accompanying drawing, the item does not need to be further defined and explained in the subsequent accompanying drawings.

The present disclosure claims the benefits of Chinese patent application No. 201610346128.2, which was filed on May 23, 2016 and is incorporated herein in its entirety by reference as part of this application.

What is claimed is:

1. An unmanned aerial vehicle (UAV) landing control device, comprising:
   a trigger command receiving module configured to receive a trigger command;
   a monitoring module configured to start monitoring under control of the trigger command and to output monitoring information based on a landing platform below a UAV, wherein the UAV has one or more rotors; and
   a rotor control module configured to determine whether to control the one or more rotors of the UAV to stop rotation based on the monitoring information, wherein:
the monitoring module includes an image acquisition device which is configured to capture and output a first image of the landing platform; and
the rotor control module is configured to control the one or more rotors of the UAV to stop rotation when the first image of the landing platform outputted by the image acquisition device is not satisfied with a predetermined standard.

2. The UAV landing control device according to claim 1, wherein:
the monitoring module includes a distance sensor which is configured to monitor a vertical distance between the UAV and the landing platform and to send the vertical distance between the UAV and the landing platform to the rotor control module; and
the rotor control module is configured to control the one or more rotors of the UAV to stop rotation when the vertical distance between the UAV and the landing platform is less than a threshold.

3. The UAV landing control device according to claim 2, wherein:
the distance sensor is further configured to output invalid identification information when the vertical distance between the UAV and the landing platform is less than a minimum measuring distance of the distance sensor; and
the rotor control module is configured to control the one or more rotors of the UAV to stop rotation based on the invalid identification information.

4. The UAV landing control device according to claim 1, wherein:
the monitoring module includes a velocity sensor which is configured to monitor a vertical descent velocity of the UAV; and
the rotor control module is configured to control the one or more rotors of the UAV to stop rotation when the landing platform makes contact with the UAV to cause a sudden change in the vertical descent velocity of the UAV.

5. The UAV landing control device according to claim 2, wherein:
the distance sensor is further configured to monitor the vertical distance between the UAV and the landing platform after the one or more rotors of the UAV stops rotation; and
the rotor control module is configured to control the one or more rotors of the UAV to accelerate rotation when the vertical distance between the UAV and the landing platform is greater than the threshold.

6. The UAV landing control device according to claim 3, wherein:
the distance sensor is further configured to monitor the vertical distance between the UAV and the landing platform after the one or more rotors of the UAV stops rotation; and
the rotor control module is configured to control the one or more rotors of the UAV to accelerate rotation when the vertical distance between the UAV and the landing platform is greater than the minimum measuring distance of the distance sensor.

7. The UAV landing control device according to claim 1, wherein:
the image acquisition device is further configured to capture and output a second image of the landing platform after the one or more rotors of the UAV stops rotation; and
the rotor control module is configured to control the one or more rotors of the UAV to accelerate rotation when the second image of the landing platform is satisfied with the predetermined standard.

8. A UAV landing control method, comprising:
receiving a trigger command by a trigger command receiving module;
starting to monitor under control of the trigger command and outputting monitoring information based on a landing platform below a UAV by a monitoring module, wherein the UAV has one or more rotors;
determining whether to control the one or more rotors of the UAV to stop rotation based on the monitoring information by a rotor control module;
capturing and outputting a first image of the landing platform; and
controlling the one or more rotors of the UAV to stop rotation when the first image of the landing platform is not satisfied with a predetermined standard.

9. The UAV landing control method according to claim 8, further comprising:
monitoring a vertical distance between the UAV and the landing platform; and
controlling the one or more rotors of the UAV to stop rotation when the vertical distance between the UAV and the landing platform is less than a threshold.

10. The UAV landing control method according to claim 9, further comprising:
outputting invalid identification information when the vertical distance between the UAV and the landing platform is less than a minimum measuring distance; and
controlling the one or more rotors of the UAV to stop rotation based on the invalid identification information.

11. The UAV landing control method according to claim 8, further comprising:
monitoring a vertical descent velocity of the UAV; and
controlling the one or more rotors of the UAV to stop rotation when the landing platform makes contact with the UAV to cause a sudden change in the vertical descent velocity of the UAV.

12. The UAV landing control method according to claim 9, wherein after controlling the one or more rotors of the UAV to stop rotation, the method further comprises:
monitoring the vertical distance between the UAV and the landing platform; and
controlling the one or more rotors of the UAV to accelerate rotation when the vertical distance between the UAV and the landing platform is greater than the threshold.

13. The UAV landing control method according to claim 10, wherein after controlling the one or more rotors of the UAV to stop rotation, the method further comprises:
monitoring the vertical distance between the UAV and the landing platform; and
controlling the one or more rotors of the UAV to accelerate rotation when the vertical distance between the UAV and the landing platform is greater than the minimum measuring distance.

14. The UAV landing control method according to claim 8, wherein after controlling the one or more rotors of the UAV to stop rotation, the method further comprises:
capturing and outputting a second image of the landing platform; and
controlling the one or more rotors of the UAV to accelerate rotation when the second image of the landing platform is satisfied with the predetermined standard.

15. A UAV, comprising the UAV landing control device according to claim 1.

16. The UAV landing control device according to claim 1, wherein the trigger command receiving module includes at least one of an antenna, an acoustic sensor, an image acquisition device and a somatosensory unit.

17. The UAV landing control device according to claim 1, wherein the trigger command includes at least one of a key command, an acoustic control command and a gesture command.

18. The UAV landing control device according to claim 2, wherein the distance sensor includes an ultrasonic sensor, a laser distance sensor or an infrared distance sensor.

* * * * *